United States Patent

[11] 3,622,271

| | |
|---|---|
| [72] Inventors | Donald H. Kelly<br>Gladstone;<br>Charles P. Bruen, Basking Ridge, both of N.J. |
| [21] Appl. No. | 777,777 |
| [22] Filed | Nov. 21, 1968 |
| [45] Patented | Nov. 23, 1971 |
| [73] Assignee | Reynolds Metals Company |

[54] PROCESS FOR PRODUCING ALUMINA OF LOW RESIDUAL NITRATE CONTENT FROM BASIC ALUMINUM NITRATES
1 Claim, 1 Drawing Fig.

[52] U.S. Cl. ........................................... 23/142,
23/1 F, 23/50, 23/102, 23/143, 23/157, 23/158
[51] Int. Cl. ........................................... C01f 7/02,
C01f 7/66
[50] Field of Search ........................................ 23/142,
143, 102, 158, 157, 1 F

[56] References Cited
UNITED STATES PATENTS
3,273,962  9/1966  Walsh........................ 23/142 X
3,211,524  10/1965  Hyde et al.................. 23/141
3,366,446  1/1968  Kelly et al.................. 23/143

Primary Examiner—Edward Stern
Attorney—Glenn, Palmer, Lyne, Gibbs & Thompson

ABSTRACT: Process for preparing a precalcined alumina of low residual nitrate content, suitable for calcining to alpha alumina, which comprises maintaining a basic aluminum nitrate prepared by heating molten aluminum nitrate nonahydrate to a temperature above its decomposition temperature but not above 230° C. under superatmospheric pressure, while removing gaseous nitric acid decomposition products, until between 45 percent and about 60 percent of the $HNO_3$ of the aluminum nitrate nonahydrate has been removed, followed by reduction of said pressure to at least as low as atmospheric pressure, said basic aluminum nitrate being of controlled free alumina content and in particulate form in a fluidized bed at temperatures of at least about 470° C. for a period sufficient to reduce the residual $N_2O_5$ content to a value of not more than about 0.02 mole or $N_2O_5$ per mole of alumina, $Al_2O_3$.

3,622,271
PATENTED NOV 23 1971
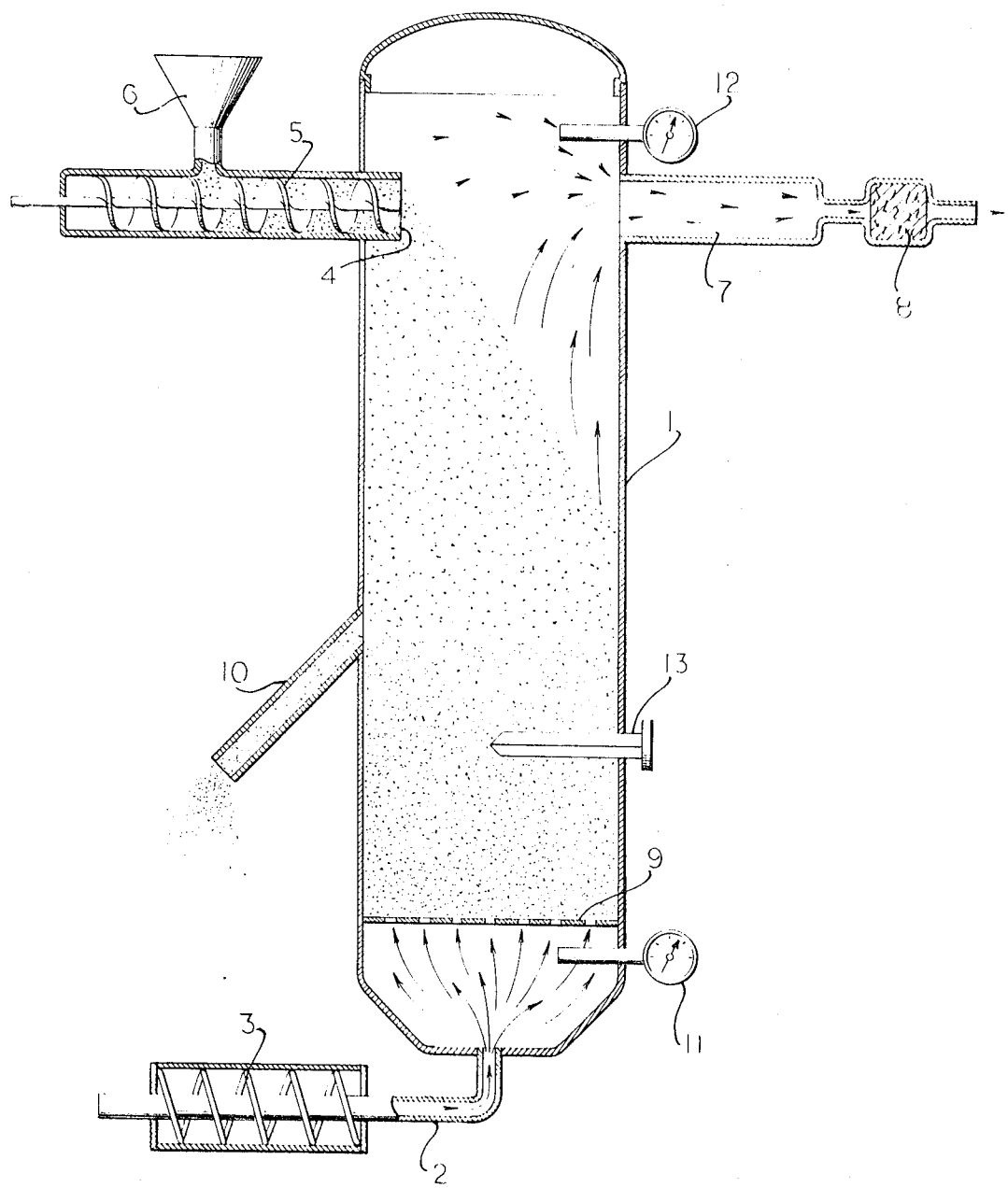
INVENTOR
Donald H. Kelly
BY Charles P. Bruen
Elizabeth Hunter
ATTORNEY

PROCESS FOR PRODUCING ALUMINA OF LOW RESIDUAL NITRATE CONTENT FROM BASIC ALUMINUM NITRATES

This invention relates to a process for preparing alumina of low residual nitrate content, from basic aluminum nitrates, said alumina being adapted for calcining to cell grade alumina.

Metallic aluminum is customarily produced by the electrolytic reduction, at temperatures of about 1,000° C., of alumina ($Al_2O_3$), dissolved in a bath of molten cryolite ($Na_3AlF_6$). For this purpose the alumina must be anhydrous and free of other volatile constituents when it is fed to the bath in order to avoid disruptive flashing of volatiles in the intensely heated medium. To insure complete absence of water and other volatiles the alumina is customarily converted to its alpha crystalline form by a final calcining operation wherein the alumina is heated for several hours at temperatures above 1,000° C. usually at about 1,200° to 1,300° C. In the resulting alpha form the alumina has little or no tendency to absorb water from its environment and become hydrated. Hence it can be handled and stored in this form without danger of hydration, until required to be fed to the electrolytic cells.

Starting materials used in the past as feed for the final calcining step have consisted of hydrated aluminas of various degrees of hydration ($Al_2O_3 \cdot xH_2O$). The hydrate obtained from the conventional Bayer process is primarily the trihydrate ($Al_2O_3 \cdot 3H_2O$). From other processes the monohydrate ($Al_2O_3 \cdot H_2O$) is obtained or mixtures of the monohydrate and trihydrate. Such aluminas are usually virtually free of volatilizable components other than water and are adapted to be calcined directly to alpha alumina by heating at temperatures above 1,000° C. to drive off the water of hydration.

When the alumina to be calcined is obtained by the nitric acid extraction of aluminous ores, however, difficulties arise from contamination of the alumina with residual nitrates which are volatile at the calcining temperatures and are highly disadvantageous because of their extreme corrosiveness with resulting damage to the metal calcination furnace which occurs when even small amounts of $N_2O_5$ are produced in the presence of even small traces of water vapor. For this reason, alumina which is to be calcined at temperatures of 1,000° C. and above should contain no more than about 2 percent $N_2O_5$ by weight of the alumina product, i.e., no more than about 0.02 mole of $N_2O_5$ per mole of $Al_2O_3$.

It is known to produce alumina by a multistage process which involves the nitric acid digestion of aluminous ores followed by crystallization of the resulting aluminum nitrate as the nonahydrate $Al(NO_3)_3 \cdot 9H_2O$, and decomposition and denitrification of the aluminum nitrate nonahydrate to alumina and nitric acid by the application of heat.

Denitrification of aluminum nitrate nonahydrate has been carried out in the past by direct application of heat at atmospheric pressure to aluminum nitrate nonahydrate crystals, which melt at 73.5° C. and boil at 135° C. with decomposition. In such atmospheric denitrification processes, decomposition can be continued with agitation of the melt until about 50 percent of the $N_2O_5$ in the melt has been removed together with water vapor from the crystals, and recovered as nitric acid ($HNO_3$), of about 50 percent concentration. The remaining melt then has a boiling point of about 148° C. and such a high viscosity (ca 10,000 centipoises or higher) that agitation becomes difficult or impracticable, resulting in clinging of the melt to the walls of the container, and local overheating of the melt which complicates further denitrification. Moreover, when the melt is cooled, it is a sticky, gummy mass, with a softening point of about 123° C. which resists further denitrification, since several hours heating at 110° C. are required to remove as little as 1 percent of the remaining nitric acid values.

In U.S. Pat. No. 3,366,446 of Donald H. Kelly and Anthony W. Yodis, granted Jan. 30, 1968, there is described a process for denitrification of aluminum nitrate nonahydrate which avoids the formation of a gummy mass and permits more complete denitrification than do prior art processes. The Kelly et al. process involves the pressure digestion of aluminum nitrate nonahydrate until about 45 percent to 60 percent of the $HNO_3$ has been removed, followed by "flashing," i.e., reducing the pressure quickly to at least as low as atmospheric, to produce a residue of basic aluminum nitrates which, on cooling, is a friable solid having a melting point between about 150° C. and about 180° C., holding the friable solid below its softening temperature and above the 120° C. boiling point of the nitric acid/water azeotrope, preferably at about 130° C., for one-half hour or more, thus producing a friable nonmelting solid, and further heating, i.e., "precalcining," the nonmelting solid to decompose it into $N_2O_5$ and solid $Al_2O_3$.

The denitrification process of the above Kelly et al. patent thus provides marked advantages over the prior art, especially in enabling the production of friable, nonmelting solids which are readily handled, instead of the gummy products of the prior art, and permitting greater nitric acid recovery. Production of the final alumina in the above Kelly et al. process, however, requires treatment of the friable solid obtained after flashing, by holding period at an elevated temperature within extremely narrow limits to avoid softening of the melt if the temperature becomes too high or failure to remove the nitric acid/water azeotrope if the temperature falls too low. Such controlled temperature was difficult to maintain because of the tendency of the friable solid to become compacted and to form local hot spots resulting in agglomeration and sticking of the solid. Furthermore, after obtaining a nonmelting solid by the controlled heating step, the subsequent "precalcining" of the nonmelting solid often yielded a final alumina which was still contaminated with appreciable quantities of contaminating nitrates.

It is therefore a primary object of the present invention to provide a process for decomposing the basic aluminum nitrates obtained after the "flashing" step in the above Kelly et al. process, wherein the step of maintaining the friable solid obtained at the flashing stage at a temperature below its softening temperature and above the boiling point of the nitric acid/water azeotrope is eliminated.

A further object of our invention is to provide a process for producing, from the basic aluminum nitrates obtained after the "flashing" step in the process of the above Kelly et al. patent, a precalcined alumina ($Al_2O_3$) containing low residual nitrate content.

A still further object of the invention is to provide a process wherein such basic aluminum nitrates are simultaneously denitrated and dehydrated in a single "precalcining" operation to provide an alumina low in residual nitrate and water contents.

Another object of the invention is to provide a process for producing, from such basic aluminum nitrates, a precalcined alumina containing no more than about 0.02 mole of residual nitrate expressed as $N_2O_5$, per mole of alumina ($Al_2O_3$), in the product.

Another object of the invention is to provide a process for the production of alumina of such low nitrate and water contents as to be adapted directly for use in the final high-temperature calcination step employed in the production of cell grade alpha alumina.

Another object of the invention is to provide a process for producing a low bulk density alumina in the form of coherent hollow spheres.

These and other objects are accomplished according to our invention wherein a solid, basic aluminum nitrate prepared by heating molten aluminum nitrate nonahydrate to a temperature above its decomposition temperature but not above about 230° C. under superatmospheric pressure sufficient to maintain said decomposition temperature, while removing gaseous nitric acid decomposition products, until between about 45 percent and about 60 percent of the $HNO_3$ of the aluminum nitrate nonahydrate has been removed, followed by reducing said superatmospheric pressure to at least as low as atmospheric pressure whereby another residue is formed which upon solidification is a friable solid having the empirical formula $$Al_2O_3 \cdot pN_2O_5 \cdot zH_2O$$

wherein $p$ is a numeral from 1.2 to 1.65 inclusive and $z$ is a numeral from 3.64 to 7.2 inclusive; and wherein said friable solid is fed, in particulate form of fluidizable particle size, to a fluidized bed zone, wherein said basic aluminum nitrate is maintained in fluidized form at a temperature of at least about 470° C., preferably between 500° and 550° C., while removing gaseous decomposition products, for a period sufficient to reduce the residual $N_2O_5$ content to a value not more than about 0.02 mole per mole of alumina, i.e., ($p$=0.02 or less).

This procedure simultaneously reduces the water content of the basic aluminum nitrate, and brings it to the very low value of not more than about 0.30 mole of $H_2O$ per mole of alumina.

The low water and nitrate content alumina produced by the process of the present invention is recovered in the form of hollow spheres of low bulk density. It is thus useful not only as cell grade alumina (after final calcining) for reduction to metallic aluminum in electrolytic cells, but has, in its originally obtained, uncalcined, expanded form, other uses such as inert fillers in plastic and rubber products, absorbents in gas chromatographic columns, as low-density fire brick and in high-temperature insulating applications and the like.

In the drawing, the single figure represents a conventional fluidizing tower wherein the process of our invention is carried out.

Referring to the drawing, 1 represents a conventional fluidizing tower equipped with a gas inlet 2 near the bottom thereof, provided with heating elements 3. Near the top of the tower is feed inlet 4, equipped with screw conveyor 5 and feed hopper 6. A gas outlet 7 provided with a filter 8 is located near the top of the tower. Spaced from the bottom of the tower is porous plate 9 defining the bottom of the fluid bed. Product exit 10 is located in the side of the tower at or near the top of the fluid bed. Pressure gauges 11 and 12 are located at the bottom and top of the tower respectively, and a thermocouple probe 13 is positioned approximately centrally in the fluid bed.

In carrying out the process according to our invention, a fluid bed is established by introducing a preheated inert gas such as nitrogen into the bottom of the fluidizing tower, and feeding into the top thereof fluidizable particles comprising either the basic aluminum nitrate starting material of the invention, or other inert particulate matter such as alumina particles of the desired particle size, then regulating conditions of gas temperature and flow rate to maintain the desired temperature in the fluid bed portion of the tower. Basic aluminum nitrate as defined herein is then fed into the fluid bed at any desired location, for example at the top of the bed. The granular material thus introduced falls by gravity into the bed and is eventually fluidized. Feeding of basic aluminum nitrate can be carried out intermittently or continuously as desired. Exit gases comprising inert gas mixed with vaporized $N_2O_5$ and $H_2O$ are taken off for example at the top of the tower. Solid alumina product is taken off from the upper portion of the fluidized bed and collected.

In the process carried out according to our invention, solid, basic aluminum nitrates which have been prepared by partial denitrification of aluminum nitrate nonahydrate, $Al(NO_3)_3 \cdot 9H_2O$, to the extent of removal of between about 45 percent and about 60 percent of the nitric acid values by digestion under pressure followed by "flashing" to atmospheric pressure or below, as described in U.S. Pat. No. 3,366,446 above referred to, and existing in friable form, and having the chemical constitution more specifically defined hereinafter, is charged, either as is, or after grinding to the desired particle size, to a fluid bed composed of suspended particles of $Al_2O_3$ preferably small enough to pass a 20 mesh U.S. sieve, and is maintained at a temperature of at least about 470° C., preferably between about 500° C. and about 550° C., for a period sufficient to reduce the nitrate content to not more than about 0.020 mole of $N_2O_5$ per mole of $Al_2O_3$ (i.e., not more than 2.0 percent $N_2O_5$ by weight based on the total weight of the alumina product). This treatment also reduces the water content of the product, bringing it down to not more than about 0.30 mole of water per mole of $Al_2O_3$ (i.e., not more than about 4.0 percent water by weight, based on the weight of the alumina product).

The process may be carried out batchwise or continuously. In either case, it may be desirable to initiate the fluidizing operation with inert particulate matter other than the basic aluminum nitrate particles. Particularly suitable for this purpose are the commercially available alpha aluminas of the required average particle size. Such aluminas are of relatively high bulk density of the order of about 60 pounds per cubic foot, as compared to final bulk densities of our product which usually range between about 9 pounds per cubic foot and about 15 pounds per cubic foot, and thus are readily separable from the resulting product if desired. In continuous operation the initiating particulate matter is soon removed in the continuous product takeoff and thus is replaced by basic aluminum nitrate feed material.

The partially denitrified product obtained after flashing as described above, and useable in our invention, is a mixture of basic aluminum nitrates containing free alumina, bound aluminum nitrate and water. It can be viewed as having the empirical formula, expressed in terms of relative moles of free alumina, bound aluminum and water, as shown below:

I a. $Al_2O_3 \cdot xAl(NO_3)_3 \cdot yH_2O$ wherein $x$ is a numeral from 1.33 to 2.5 inclusive, $y$ is a numeral from to 16 inclusive. By "free" alumina is meant that portion of the aluminum existing as the oxide and not bound by the nitrate radical.

Expressed in terms of total aluminum as $Al_2O_3$, $N_2O_5$ and water, the empirical 6 can be written I b. $Al_2O_3 \cdot pN_2O_5 \cdot zH_2O$ wherein $p$ is a numeral ranging from 1.2 to 1.65 inclusive, and $z$ is a numeral from 3.64 to 7.2 inclusive.

These formulas represent basic aluminum nitrates which result from the denitrification of normal aluminum nitrate nonahydrate $Al(NO_3)_3 \cdot b9H_2O$ to the extent of removing between 45 percent and 60 percent of the proportion of bound nitrates contained in the normal nitrate.

At 50 percent denitrification the formula of the basic aluminum nitrates can be written as II 2. $Al_2O_3 \cdot 2.0Al(NO_3)_3 \cdot 12H_2O$ or
II b. $Al_2O_3 \cdot 1.5N_2O_5 \cdot 6H_2O$ The degree of denitrification of the basic aluminum nitrate starting material of our invention may vary, but preferably should have at least about 45 percent of the $N_2O_5$ of the starting $Al(NO_3)_3$ removed, i.e., the mass should contain no more than about 55 percent of the amount of bound nitrates compared to the amount in normal aluminum nitrate $Al(NO_3)_3$, preferably between about 55 percent and about 40 percent. Lower degrees of denitrification produce gummy products which cannot readily be ground and suspended in the fluid bed. On the other hand, aluminum nitrate charges which have been denitrified to the extent of removing more than about 60 percent of the $N_2O_5$ originally in the normal nitrate, are unsatisfactory since they pulverize excessively at fluid zone temperatures and produce an excessive amount of dust, a large proportion of which is entrapped in the exit gases and carried out of the bed with such gases. We therefore prefer to use denitrified charges from which between about 45 percent and about 60 percent of the $N_2O_5$ has been removed, i.e., which contain chemically bound nitrates in proportions between about 55 percent and about 40 percent of the nitrates in normal aluminum nitrate, $Al(NO_3)_3$.

Not only must the basic aluminum nitrates used in our fluidizing process have the chemical constitution described above, but they must also have physical properties of the character provided by the pressure digestion—"flashing" procedures of the Kelly et al. process referred to above. Thus, we have found that the basic aluminum nitrates prepared by the Kelly et al. process, whose particles have been adjusted to fluidizable size, have the unexpected property, when subjected to temperatures of at least about 470° C. in a fluidized bed, of expanding, without fragmentation, to produce hollow, coherent, roughly spherical particles from which $N_2O_5$ and water are readily released, but which retain this structure and high bulk during the fluidization which prevents their entrapment and removal by the exit gases. The precise physical properties which cause the basic aluminum nitrates produced by the above Kelly et al. process to behave in this manner are not clearly understood. However, basic aluminum nitrates of the same chemical constitution, but prepared by denitration of aluminum nitrate nonahydrate under atmospheric pressure and adjusted to the same initial particle size, do not expand to form coherent hollow spheres as do the Kelly et al. materials, but instead, when fluidized under the same conditions, disintegrate rapidly and substantially completely to a fine dust of which a large proportion becomes entrapped in the exit gases and is carried out of the bed thereby. Such product is then recoverable only with difficulty and at economically prohibitive expense. Furthermore, the product recovered from the atmospheric pressure produced basic aluminum nitrates is not only in low yield, but often contains an unacceptably high residual $N_2O_5$ content.

The particle size of the basic aluminum nitrates used in our invention is not unduly critical and can be any size capable of being fluidized under the particular conditions employed in the fluidized bed as is well understood in the art. In general, average particle size should be small enough to pass through a 20 mesh U.S. sieve (about 840 microns), preferably of a size to pass through 40 mesh and be retained on a 100 mesh U.S. screen, i.e., preferably between about 420 microns and about 150 microns. The "flashed" material obtained as described in U.S. Pat. No. 3,366,446 above referred to usually is produced with average particle size somewhat larger than desired for fluidizing, but since it is readily friable, it is easily reduced to the desired size, as by crushing or grinding. Particles larger than about 840 microns not only are difficult to fluidize but tend to be denitrified slowly. Particles smaller than about 150 microns are disadvantageous in that they tend to be entrained in the exit gases and present a problem of removal therefrom.

The temperature maintained in the fluid bed is critical and should be at least about 470° C. to insure substantially complete volatilization and removal of residual nitrates as $N_2O_5$. Preferred temperatures are between about 500° C. and about 550° C. Temperatures higher than 550° C. can be used, but tend to cause excessive fragmentation of the particles with resulting dusting and entrainment of particles in the exit gases.

Residence time of particles in the fluid bed depends to some extent on particle size of the charge, smaller particles requiring shorter times for substantially complete nitrate and water removal. Within the preferred particle size range, both denitration and dehydration are very rapid, so that usually a residence time in the fluid bed between about 1 hour and about 3 hours is sufficient.

The following specific examples further illustrate our invention. Parts are by weight except as otherwise noted.

EXAMPLE 1

A fluid bed reactor was prepared by assembling a 2-inch diameter, 5-foot high Pyrex tube in two sections, including a bottom 1-foot section separated from a 4-foot top section by a porous plate. The lower section was equipped with heating elements, and a gas inlet was provided near the bottom of the lower section. An inlet for solid feed particles and a gas exit opening were positioned near the top of the upper section on opposite sides thereof, and an outlet for solid product was positioned in the lower (fluid bed) portion of the upper section of the tube. Water manometers were connected near the top and bottom respectively of the upper section of the tube to measure pressure differential across the bed.

Into the bottom of the upper section of the tube was placed 150 parts of a commercial activated alumina having a bulk density of 60 pounds per cubic foot and being composed of 60 percent 40/60 mesh particles and 40 percent of 60/100 mesh particles. Nitrogen gas, preheated to about 430° C. was introduced through the gas inlet in the lower section of the tube, causing the active alumina particles to become heated and fluidized and to occupy about half the volume of the upper tube. Flow of nitrogen gas was increased until the pressure differential across the fluid bed remained unchanged at 50 mm. $H_2O$. After establishment of the fluidized bed at a temperature of 430° C., 50 parts of basic aluminum nitrate feed, prepared by pressure digestion at 180° C. of aluminum nitrate until about 50° percent of the nitric acid originally in the charge had been removed, followed by "flashing" to atmospheric pressure, as described in example 1 of U.S. Pat. No. 3,366,446, having an analysis of 25.5 percent $Al_2O_3$, 40.5 percent $N_2O_5$ and 34 percent $H_2O$ (i.e., a formula of $Al_2O_3 \cdot 1.5N_2O_5 \cdot 6H_2O$) and ground to the same particle size and distribution as the active alumina bed material, i.e., 60 percent 40/60 mesh and 40 percent 60/100 mesh, was added to the fluid bed through the upper feed inlet at the rate of one part per minute over a period of 50 minutes, during which time water vapor and $N_2O_5$ vapor were evolved and led out of the upper gas exit to a condenser where they were collected as $HNO_3$. The bed was maintained in fluidized condition at a temperature of 430° C. until no more oxides of nitrogen were being evolved, a period of about 2.5 hours following the addition period. The condensed $HNO_3$ amounted to 22.9 parts, equivalent to 98.0 percent of the $HNO_3$ in the basic aluminum nitrate fed to the fluid bed. After completion of the dentrification as indicated by cessation of release of oxides of nitrogen, the solid product was discharged from the bed. The product resulting from the feed material was in the form of low-density (9.6 pounds per cubic foot) hollow particles, about 68 percent appearing as agglomerates. The high-density activated alumina of the original fluid bed material was unchanged. The product and the original bed material were separated by screening. The alumina product thus recovered was in the form of agglomerated hollow spheres and had a bulk density of 9.6 pounds per cubic foot. Analysis showed it to contain 90.5 percent $Al_2O_3$; 4.21 percent $N_2O_5$ and 5.29 percent $H_2O$ by weight, i.e., 5.5 percent water by weight based on the total weight of alumina and water as compared to 15.1 percent water by weight in alumina monohydrate.

The composition of the resulting product was equivalent to the empirical formula $$Al_2O_3 \cdot 0.044N_2O_5 \cdot 0.33H_2O$$

It is apparent from the above formula that the temperature of about 430° C. maintained in the fluid bed is too low to produce an alumina containing the desired low nitrate content of no more than about 0.020 mole of $N_2O_5$ per mole of $Al_2O_3$.

EXAMPLE 2

Using the same fluidized bed equipment and 150 parts of an alumina bed material consisting of a portion of the bed material remaining in example 1 calcined at 1,094° C. and composed of 90 parts 40/60 mesh particles and 60 parts 60/100 mesh particles, and 50 parts of the same basic aluminum nitrate feed material as described in example 1, composed of 30 parts 40/60 mesh and 20 parts 60/100 mesh material, the bed temperature was maintained at about 480° C. during the 2½ hour course of the dentrification carried out as in example 1.

The resulting product was collected from the fluid bed and amounted to 12.8 parts of hollow spheres of a bulk density 9.3 pounds per cubic foot which were considerably less agglomerated (39 percent vs. 68 percent) than the spheres produced in example 1 and had thinner walls.

An analysis of the product particles showed 94.2 percent $Al_2O_3$; 1.7 percent $N_2O_5$ and 4.08 percent representing 4.1 percent water by weight on the total weight of alumina and water, and a significantly lower residual $N_2O_5$ than that of example 1. The resulting product has the constitution shown in the empirical formula $$Al_2O_3 \cdot 0.017N_2O_5 \cdot 0.25H_2O$$

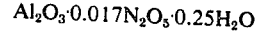

EXAMPLE 3

Using the same fluidized bed equipment used in the foregoing examples, and 150 parts of an alumina bed material like that used in example 2, there was fed to the fluid bed, 50 parts of the same basic aluminum nitrate used in the foregoing examples except that 30 parts were of 40/60 mesh particle size, 20 parts were of 60/100 mesh particle size. The fluidized bed in this case was maintained at a temperature of 540° C. for a period of about 2½ hours. The resulting fluidized particles were collected, and amounted to 8.9 parts of hollow spheres of bulk density 9.3 pounds per cubic foot, which were only slightly agglomerated (about 10 percent). An analysis of the product particles showed 97.1 percent $Al_2O_3$; 0.82 percent $N_2O_5$ and 2.08 percent $H_2O$ representing 2.1 percent water by weight on the total weight of alumina and water, and an extremely low residue of $N_2O_5$.

The resulting product has the constitution shown in the empirical formula $$Al_2O_3 \cdot 0.008 N_2O_5 \cdot 0.12 H_2O$$

A summary of results obtained in examples 1–3 is given in table I below:

TABLE I.—RESIDUAL $N_2O_5$ AND $H_2O$ IN ALUMINA PRODUCT AFTER 2½ HOURS IN FLUID BED AT DIFFERENT TEMPERATURES

| Example No. | Temp., ° C. | Residual $N_2O_5$ | | Residual $H_2O$ | |
|---|---|---|---|---|---|
| | | Weight percent | Moles per mole $Al_2O_3$ | Weight percent | Moles per mole $Al_2O_3$ |
| 1 | 430 | 4.21 | 0.044 | 5.29 | 0.33 |
| 2 | 480 | 1.72 | 0.017 | 4.08 | 0.25 |
| 3 | 540 | 0.80 | 0.008 | 2.08 | 0.12 |

It is apparent from table I that a fluid bed temperature of 430° C. is too low to produce an alumina product of not more than about 0.02 mole per mole of alumina, and that a temperature of at least about 470° C. is necessary to produce an alumina of this low an $N_2O_5$ concentration.

While the foregoing describes the preferred embodiments of our invention, it will be understood that departures can be made therefrom within the scope of the specification and claims.

1. In producing alumina of low nitrate content from molten aluminum nitrate nonahydrate by denitrifying said molten nitrate under superatmospheric pressure, flashing the resultant basic aluminum nitrates to atmospheric pressure, and precalcining thereof, the process improvement which produces precalcined alumina of low bulk density in the form of hollow, coherent, roughly spherical particles low in residual nitrate and water contents, comprising:

A. stopping said denitrifying under superatmospheric pressure and adjusting said flashing to produce friable particles having an average size between about 150 microns and about 840 microns and having the empirical formula:

$$Al_2O_3 \cdot p N_2O_5 \cdot z H_2O$$

wherein $p$ is a numeral from 1.2 to 1.65 inclusive and $z$ is a numeral from 3.64 to 7.2 inclusive, and B. expanding said friable particles, without fragmentation, into said roughly spherical particles by subjecting said friable particles to precalcining temperatures of 470°–550° C. in a fluidized bed zone while removing gaseous decomposition products during a residence period, of between about 1 hour and about 3 hours, that is sufficient to reduce said $p$ to not more than about 0.02 mole of $N_2O_5$ per mole of $Al_2O_3$ and to reduce said $z$ to not more than about 0.30 mole of water per mole of $Al_2O_3$ so that said precalcined alumina has a bulk density between about 9 and about 15 pounds per cubic foot.

* * * * *